United States Patent [19]

Hackett

[11] 4,028,886

[45] June 14, 1977

[54] PASSIVE CHAMBER WALL FRAGMENTER

[75] Inventor: Robert D. Hackett, Florissant, Mo.

[73] Assignee: McDonnell Douglas Corporation, St. Louis, Mo.

[22] Filed: Oct. 23, 1975

[21] Appl. No.: 624,784

[52] U.S. Cl. .................................... 60/245; 60/250; 60/270 S; 137/68 A; 220/261

[51] Int. Cl.² ...................... F02K 9/04; F02K 7/10

[58] Field of Search ........ 52/1; 244/118 P, 122 AF; 60/244, 225, 245, 250, 254, 270 R, 270 S, 263; 137/68 A, 68 R, 70; 220/261

[56] References Cited

UNITED STATES PATENTS

| 3,313,113 | 4/1967 | Maxson et al. | 220/261 |
|---|---|---|---|
| 3,729,154 | 4/1973 | Deplante | 244/122 AF |
| 3,778,010 | 12/1973 | Potts | 244/122 AF |
| 3,855,789 | 12/1974 | Platzek | 60/225 |
| 3,879,942 | 4/1975 | Dorn et al. | 60/245 |
| 3,888,079 | 6/1975 | Diesinger | 60/245 |
| 3,901,028 | 8/1975 | Leingang | 60/225 |
| 3,938,764 | 2/1976 | McIntyre et al. | 244/118 P |

Primary Examiner—William L. Freeh
Assistant Examiner—Robert E. Garrett
Attorney, Agent, or Firm—Gravely, Lieder & Woodruff

[57] ABSTRACT

A passive chamber wall fragmenter adapted to be mounted on or in connection with a portion of a chamber wall which is mounted to be dislodged by a pressure differential across the wall portion, wherein the fragmenter is adapted to become active upon displacement of the wall portion to cause the displaced wall portion to fragment or break up into small pieces so as to minimize damage that might result from larger pieces striking sensitive structure making up the chamber.

10 Claims, 5 Drawing Figures

PASSIVE CHAMBER WALL FRAGMENTER

BRIEF DESCRIPTION OF THE INVENTION

This invention relates to passive chamber wall fragments and particularly to improvements in the mounting of operation thereof.

The present invention finds utility in connection with means to initially separate chambers or spaces subject to different pressure conditions, and is particularly useful in association with chambers provided with a wall portion that is subject to displacement in one direction upon the attainment of a predetermined condition of differential pressure between the chambers or spaces, such as when the pressure in one chamber to be protected drops below a predetermined value relative to pressure in an adjacent chamber.

In certain conditions in aircrafts where sudden decompression may occur, it is particularly important to minimize the effect of such decompression by providing the separating wall between the cabin and the storage with means to control the effect of pressure changes so as to prevent serious structural failure. Another example of the utility of the present invention is related to missiles which embody a dual propulsion system, such as in convertible rocket-to-ramjet missiles. In these cases it is important to contain the chamber with the higher pressure, and in a missile it is important to isolate the ram air space from the rocket combustion chamber during rocket operation by a frangible wall which is adapted to be displaced by pressure into the combustion chamber and almost simultaneously fragmented. The switch from rocket to ramjet propulsion occurs on rocket fuel burn-out when the missile body is traveling at a sufficient velocity, usually supersonic, to cause the frangible wall to be dislodged and ramjet operation is initiated. The frangible wall in such cases, must be caused to fragment before reaching the missile exhaust nozzle, thereby preventing the unbroken frangible wall from passing through the nozzle before it has been fragmented and reduced to smaller bits which can pass through the nozzle without causing serious damage.

Devices of the present character have, in the past, been arranged in connection with sensory devices which measure the pressure differential across a frangible wall separating two spaces, and some installations having relied on electrical stimuli to control the effect of a pressure differential between two spaces separated by a displaceable wall portion.

It is a principal object of the present invention to provide a passive mechanical fragmenter for causing a movable wall portion of a chambered space to be reduced to fragments without relying on external sensors or electrical stimuli. Other objects of the present invention will be set forth in the following detailed description of an exemplary embodiment.

A preferred embodiment of the present invention has been illustrated in connection with a combination rocket-to-ramjet missile where the rocket combustion is utilized to gain the necessary velocity at which the ramjet operation will be capable of operating to sustain flight of the missile. It has been found that sensors and electrical, stimuli heretofore relied upon is not necessary, but a much simpler and less expensive system using passive mechanical means can be most effective to accomplish the purpose of causing a wall portion of a chamber when displaced by the occurance of a pressure differential to become fragmented and reduced to much smaller particles and bits less injurious or damaging to adjacent structure.

BRIEF DESCRIPTION OF THE DRAWINGS

The present invention is shown in a presently preferred embodiment in the accompanying drawings, wherein.

DETAILED DESCRIPTION OF THE EMBODIMENT

The principle of the present invention is embodied in a passive device in association with a frangible wall separator between two chambers or spaces which are subjected to different pressure conditions and to arrange the separator wall so that it will be fragmented when the pressure differential across the wall separator reaches a state where the wall separator is displaced from its chamber separating position. The passive device to be set forth in this description is one which does not initiate an action but just responds to an action or movement of some other object such as the separator wall.

Figure 1:
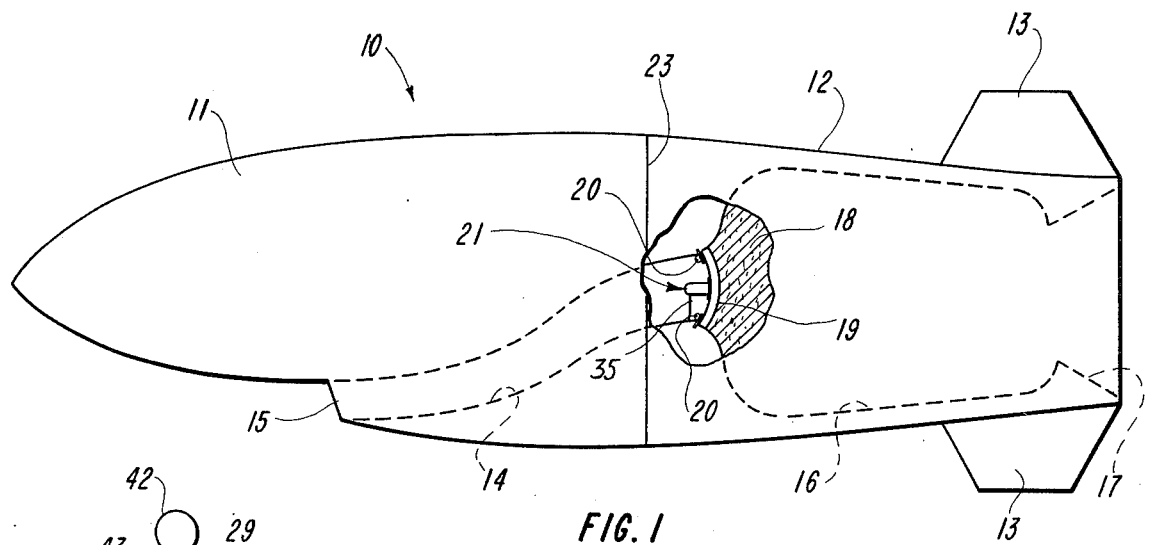
FIG. 1 is a longitudinal view, partly in section, of a missle convertible from rocket-to-ramjet operation.

The present invention is embodied in a missile 10 shown in FIG. 1 to be made up of a nose section 11 and an aft section 12 provided with directional and stablizer fins 13 arranged around the trailing end of the aft portion 12. The nose portion 11 is constructed in the usual manner to include, among other facilities, a fuel containing compartment (not shown), and in addition there is a duct 14 formed in this portion so as to present an inlet 15 to receive ram air during the flight of the missile.

The aft portion 12 is formed with a combustion chamber 16 which terminates in an exhaust nozzle 17. The combustion chamber 16 contains a suitable solid rocket fuel charge 18 which when ignited by suitable means (not shown) will exhaust through the nozzle 17 and propel the missile 10.

It is seen in FIG. 1 that the duct 14 which constitutes a chamber or space different from the combustion chamber 16 is separated from the combustion chamber by a wall element 19 which is secured in position by breakaway clips 20. In addition to the clips which may be secured to one surface of the wall 19, the wall carries a fragmenter device 21 on the side facing the ram air duct or space 14, and the device 21 is provided with a trigger to be described. The missle 10 is made in at least the respective nose and aft portions 11 and 12 with the parting line 23 located near the separator wall 19 so that this wall may be installed in a convenient manner before the nose portion 11 is joined to the aft portion 12.

Figure 2:
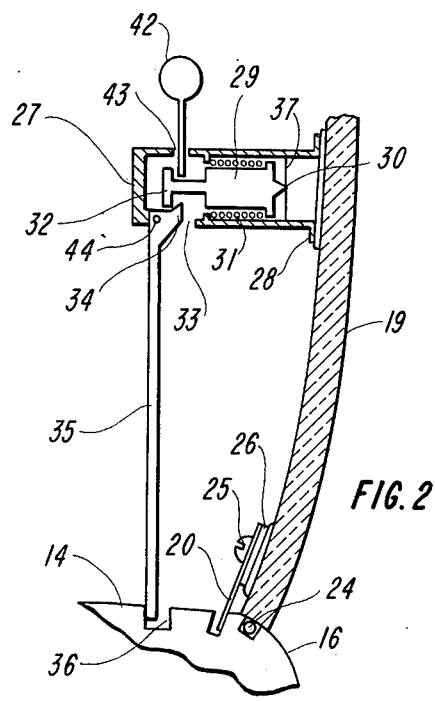
FIG. 2 is a greatly enlarged and fragmentary detailed view of the frangible chamber wall and the passive mechanical fragmenter therefore.

Turning now to FIG. 2 the separator wall 19 is made of a frangible material, such as glass or plastic, and it is suitably curved or given a dome shape so that the curvature is directed into the combustion chamber 16 which is initially at a considerably higher pressure than the pressure in the ram air duct 14. The separator wall 19 abuts the adjacent wall of the combustion chamber 16 and is sealed thereto by a suitable circumferential seal ring 24. A plurality of breakaway retainer clips, like that shown at 20, are distributed around the perimeter of the separator wall 19. The clip 20 illustrated in FIG. 2 is secured by threaded elements 25 engaged in a mounting plate 26 bonded to the adjacent surface of the wall 19.

The wall 19, near its central area, carries a housing 27 which is secured by bonding at the flange 28 to the adjacent surface of the wall 19. The housing 27 supports a plunger 29 having a point 30 directed at the wall 19. The plunger 29 is powered by a stored energy means, such as spring 31, and the plunger is provided with a cocking arm 32 located in a space of the housing 27 which is formed with a slot 33 to receive the detent end 34 of a trigger 35. The extreme outer end of the trigger 35 is adapted to be captured in a slot of recess 36 formed in the ram air duct 14.

Figure 3:
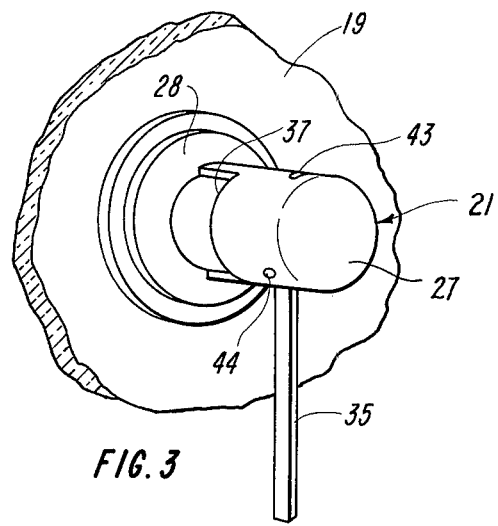
FIG. 3 is a fragmentary perspective view of the passive mechanical fragmenter.
Figure 4:
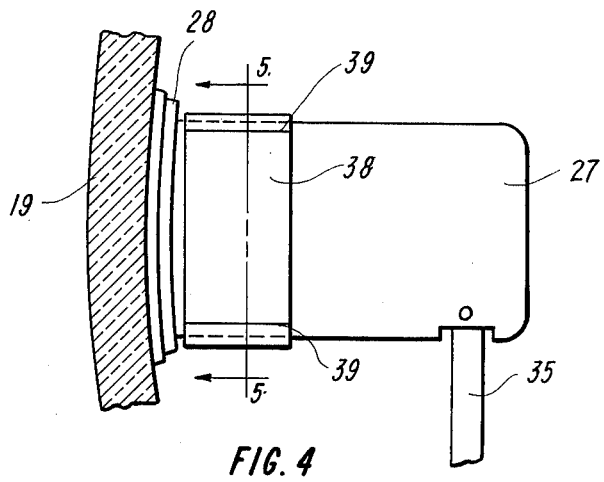
FIG. 4 is a side view of the fragmenter of FIG. 3.
Figure 5:
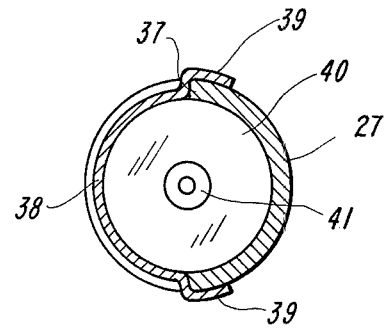
FIG. 5 is a sectional view taken at line 5—5 in FIG. 4.

Further details of the housing 27 and the assembly of components associated therewith are seen in FIGS. 3, 4 and 5. In FIGS. 3 and 4 the housing 27 is shown bonded at the flange 28 to the surface of the wall 19 on the convex side thereof such that the trigger 35 will extend in the proper direction to be engaged in the slot 36. The housing 19, adjacent the mounting flange 28, is formed with a slot 37 which extends through substantially 180°, and the slot is adapted to be closed by a snap or cover 38 having retaining flanges 39 at its opposite ends. When the cover 38 is removed it opens the slot 37 which is adapted to receive a stored energy explosive capsule 40, shown in FIG. 5. The capsule 40 is presented with its detonator 41 positioned to be pierced by the plunger point 30.

When installing the separator wall 19 it is necessary to place the retainer clips 20 in proper position so that the periphery of the wall 19 is seated against the seal ring 24. A minimum of three clips 20 may be sufficient, but more clips can be easily bonded in the manner above described. The arming of the plunger 29 is accomplished, by reaching through the slot 33 or the slot 37 and forcing the plunger 29 (leftwardly as shown in FIG. 2) until an installation safety pin 42 can be inserted through an aperture 43 in the housing 27 to engage the cocking arm 32. After the pin 42 has been placed, the trigger 35 can be assembled with its detent end 34 engaging the cocking arm 32 and the outer end of the trigger 35 inserted in the slot 36. A pivot pin 44 is then pressed into position through the housing 19 so as to engage and hold the trigger detent end 34 in operative position. At this time the pin 42 is withdrawn, and the nose portion 11 of the missile may be then assembled to the aft portion 12 in the usual manner. After the wall 19 and fragmenter components are assembled the solid rocket fuel charge may be installed, but before assembly of the nose portion 11 the components on the side of duct 14 may be coated (not shown) with a layer of material that will cover sharp edges and parts capable of damaging the exhaust nozzle 17 or adjacent parts.

The example of a missile is believed to be an exemplary disclosure of the concept of separating a pair of adjacent chambers or spaces for a period of time, or until a predetermined change in the pressure conditions occurs, at which time the separating wall will be displaced. At the moment of wall displacement it is desired to fragment or reduce the wall to substantially smaller bits and pieces so that damage to important structure in one of the chambers will not take place.

In the missile operation seen in FIG. 1, the solid rocket fuel charge 18 during its burning will raise the pressure in the combustion chamber 16 to a much higher value than the pressure developed in the ram air duct 14. The separator wall 19 is constructed of glass or fiber material of a sufficient thickness to withstand the higher pressure in the combustion chamber 16. The burning of the rocket fuel 18 will terminate with a pronounced drop in the pressure in the combustion chamber. At the moment of pressure drop in chamber 16 the pressure exerted by ram air duct 14 will be sufficient to rupture the clips 20. As shown in FIG. 2, when the clips 20 rupture the wall 19 will bodily move rightwardly so that the trigger 35 will be pivoted in a direction to break the contact between the detent 34 and the cocking arm 32 of the plunger 29, thereby releasing the stored energy in the spring 31 to drive the plunger toward the open end of the housing 27 where the point 30 will strike against the wall 19 to initiate its fragmentation. In this way the wall 19 will be reduced to fragments of a size that will not damage the nozzle structure 17. On fragmentation of the wall 19 the missile 10 will be converted from rocket propulsion to ramjet propulsion, and the ramjet will be supplied with fuel carried in the nose portion 11 in the usual manner.

It may be desirable under certain conditions where the material of the separating wall 19 requires increased strength or increased thickness to close off larger openings between two adjacent spaces, to augment the stored energy released by the action of trigger 35. In such conditions, an explosive capsule 40 may be placed in the housing 27 in front of the plunger 29 and with its detonator 41 in position to be hit by the point 30. The explosive capsule will have a stored energy charged effective to fragment the thicker or tougher wall 19. The snap on cover 38 is provided to retain the explosive capsule 40 in operation position.

While missile 10 has been chosen to illustrate the improvement above described, it is understood that the improvement may be employed in other ways. For example, aircraft having pressurized cabin spaces and separate cargo spaces may employ several separator walls of appropriate size, each having a fragmenter of the type shown herein, to cause separator wall fragmentation on the occurance of an adverse differential pressure condition between cabin and cargo spaces. The object of such an installation is to prevent serious damage to structural components which would occur if the separator walls were not fragmented and reduced in size.

What is claimed is:

1. In a chamber separator wall fragmenter, the combination of a body having adjacent chambers subject to different pressure conditions, a separator wall positioned in said body to interrupt communication between said body chambers, releasible means engaged with one surface of said separator wall and with the surface of one chamber, release by said releasible means permitting said separator wall to move bodily into the other of said adjacent chambers, and means carried by said separator wall in position to fragment said separator wall upon predetermined bodily movement thereof into said other chamber.

2. The combination set forth in claim 1, wherein said means to fragment said separator wall comprises a housing on said separator wall, wall fragmenting means in said housing, and a trigger holding said wall fragmenting means in position ready to be activated, said trigger being responsive to the bodily movement of said separator wall into the other of said chambers.

3. The combination set forth in claim 1, wherein said means to fragment said separator wall comprises a movable pointed plunger, means directing the movement of said pointed plunger against said separator wall, and trigger means holding said pointed plunger in a cocked position spaced from said separator wall, said trigger being activated by separator wall bodily movement to release its hold on said pointed plunger.

4. The combination set forth in claim 1, wherein said means to fragment said separator wall comprises a movable pointed plunger, means directing the pointed plunger movement, trigger means holding said pointed plunger in a position spaced from said separator wall, said trigger means being activated by separator wall bodily movement to release its hold on said pointed plunger, and explosive means adjacent said separator wall in position to be detonated by movement of said pointed plunger.

5. In a passive chamber wall fragmenter for use in fragmenting a separator wall between adjacent chambers subject to different pressure conditions, the combination of a body formed with adjacent spaces, a separator wall releasibly mounted in said body to separate said spaces, means to seal said separator wall in its mounted position, a stored energy device disposed in one of said body spaces in position to fragment said separator wall, and means connected to said device to release the stored energy of said device upon release of said separator wall under the occurance of a pressure condition sufficient to cause release of said separator wall, the release of said stored energy being directed by said device against said separator wall to fragment the same.

6. The combination set forth in claim 5, wherein said stored energy device is carried by said separator wall, and said release means is engaged with a surface of said one body spaces in position to respond to separator wall movement and release the stored energy.

7. The combination set forth in claim 5, wherein said stored energy device comprises a housing, a plunger in said housing, stored energy means engaged with said plunger in position to drive said plunger into fragmenting impact on said separator wall, and detent means on said release means engaged on said plunger to retain said plunger spaced from said separator wall.

8. The combination set forth in claim 5, wherein said stored energy device comprises a housing, a plunger in said housing, first stored energy means engaged on said plunger in position to displace said plunger, second stored energy means in said housing in the path of displacement of said plunger, and detent means on said release means engaged with said plunger and movable to release said plunger whereby said stored energy means are set free to fragment said separator wall.

9. In a passive chamber wall fragmenter for a rocket-to-ramjet propelled missile, the improvement in the missile having a ram air space and a rocket fuel combustion space terminating in an exhaust nozzle, of a separator wall mounted in the missile to separate the ram air space from the combustion space, said separator wall being seated on the combustion space wall, breakaway means retaining said separator wall in seated position, a stored energy fragmenter device carried by said separator wall on the ram air space side and in position to fragment said separator wall, and triggering means operatively connected between said device and ram air space to retain said stored energy and responsive to separator wall movement upon said breakaway means failing to retain said separator wall in seated position to release said stored energy to fragment said separator wall.

10. The improvement set forth in claim 9, wherein said stored energy device comprises a housing open to said separator wall, a plunger in said housing and resilient means to drive said plunger toward said housing open end to fragment said separator wall.

* * * * *